US008725612B2

(12) United States Patent
Mundinger et al.

(10) Patent No.: US 8,725,612 B2
(45) Date of Patent: May 13, 2014

(54) PERSONALIZED REAL-TIME LOCATION-BASED TRAVEL MANAGEMENT

(75) Inventors: Jochen Mundinger, Renens (CH); Markus Waibel, Chavannes (CH)

(73) Assignee: Routerank Ltd., Lausanne (CH)

( * ) Notice: Subject to any disclaimer, the term of this patent is extended or adjusted under 35 U.S.C. 154(b) by 180 days.

(21) Appl. No.: 12/784,087

(22) Filed: May 20, 2010

(65) Prior Publication Data
US 2010/0228574 A1 Sep. 9, 2010

Related U.S. Application Data

(63) Continuation of application No. PCT/EP2008/062396, filed on Sep. 17, 2008.

(60) Provisional application No. 61/004,114, filed on Nov. 24, 2007.

(51) Int. Cl.
*G06Q 40/00* (2012.01)

(52) U.S. Cl.
USPC ............................................................ 705/35

(58) Field of Classification Search
USPC .................................................... 705/35–45
See application file for complete search history.

(56) References Cited

U.S. PATENT DOCUMENTS

| 4,947,350 | A | * | 8/1990 | Murray et al. | 702/181 |
|---|---|---|---|---|---|
| 6,085,976 | A | * | 7/2000 | Sehr | 235/384 |
| 7,546,206 | B1 | | 6/2009 | Miller et al. | |
| 2002/0082771 | A1 | * | 6/2002 | Anderson | 701/209 |
| 2003/0033164 | A1 | | 2/2003 | Faltings et al. | |
| 2003/0096621 | A1 | * | 5/2003 | Jana et al. | 455/456 |
| 2005/0015316 | A1 | | 1/2005 | Salluzzo | |
| 2005/0216301 | A1 | | 9/2005 | Brown | |
| 2006/0106506 | A1 | * | 5/2006 | Nichols et al. | 701/3 |
| 2006/0206363 | A1 | | 9/2006 | Gove | |
| 2006/0247954 | A1 | | 11/2006 | Hunt | |
| 2006/0265256 | A1 | * | 11/2006 | Galperin et al. | 705/5 |

(Continued)

FOREIGN PATENT DOCUMENTS

| EP | 0645603 | | 3/1995 |
|---|---|---|---|
| EP | 1271104 | | 1/2003 |
| EP | 1677075 | A1 | 7/2006 |
| GB | 2403008 | A | 12/2004 |

OTHER PUBLICATIONS

Glen Warchol "Delta Air Lines' New System Helps Salt Lake City Passengers Rebook Flights", The Salt Lake Tribune, Dec. 4, 2003, p. 1.*

(Continued)

*Primary Examiner* — Robert Niquette
*Assistant Examiner* — Chia Yi Liu
(74) *Attorney, Agent, or Firm* — Pearne & Gordon LLP

(57) ABSTRACT

A personalized real-time location-based travel management method, the method including the steps of
 (a) defining a departure point and a destination for multi-modal travel,
 (b) computing in an IT system (30) a list of candidate routes between said departure point and said destination, based on schedule information available to said IT system;
 (c) making travel information relating to a selected route available to a user's personal travel assistant (40) or a database (31) while traveling; and
 (d) detecting in said IT system an unexpected event during said travel, and computing an alternative list of candidate routes or routes segments in response to said unexpected event.

16 Claims, 4 Drawing Sheets

(56) References Cited

U.S. PATENT DOCUMENTS

| | | |
|---|---|---|
| 2007/0078729 A1 | 4/2007 | Brown |
| 2007/0100962 A1 | 5/2007 | Barth et al. |
| 2007/0124066 A1* | 5/2007 | Kikuchi et al. ............... 701/209 |
| 2007/0239348 A1 | 10/2007 | Cheung |
| 2007/0276595 A1* | 11/2007 | Lewinson et al. ............. 701/209 |
| 2009/0105936 A1* | 4/2009 | Shibasaki .................... 701/200 |
| 2009/0119135 A1 | 5/2009 | Schoeman et al. |
| 2010/0083095 A1 | 4/2010 | Nikovski et al. |
| 2010/0305984 A1 | 12/2010 | Ben-Yitschak et al. |
| 2010/0312464 A1 | 12/2010 | Fitzgerald et al. |
| 2011/0150470 A1 | 6/2011 | Jenkins et al. |

OTHER PUBLICATIONS

International Search Report for PCT/EP2008/062396 dated Mar. 20, 2009.

International Search Report for PCT/EP2008/062395 dated Jan. 5, 2009.

* cited by examiner routeRANK

Finding your way

From: Bern  Departure: 2007-12-06
To: Nuremberg Hbf  Time: 12:00

>> search!

Computing routes...

✓ Bern » Nuremberg
✓ Bern » Basel (BSL) » Munich (MUC) » Nuremberg
✓ Bern » Basel (BSL) » Nuremberg (NUE) » Nuremberg
○ Bern » Geneva (GVA) » Munich (MUC) » Nuremberg
○ Bern » Geneva (GVA) » Nuremberg (NUE) » Nuremberg
✓ Bern » Zürich (ZRH) » Munich (MUC) » Nuremberg
✓ Bern » Zürich (ZRH) » Nuremberg (NUE) » Nuremberg

Search | FAQ | News | Feedback | About us | Terms of Use | Privacy Policy | Press | Participation | Contact |

Fig.3

Finding your way

From: Bern
To: Nürnberg Hbf
Departure: 2007-11-19
Time: 12:00

>> search!

Currency: CHF | EUR
Summary: DeutscheBahn
Show: BahnCard 50 ▼

Fares and Reduction
GFF
2nd Class, No Pass ▼ routeRANK

Options for your results
Sort: Departure | Arrival | Travel with | Duration | Price | Co2

Bern to Nürnberg Hbf on 2007-11-19 at 12:00

Air Berlin offers you a special deal to travel from Zürich (ZRH) to Nuremberg (NUE)!
Click here for more information

| Dep/Arr | via | Travel with | Duration | Price | Buy Co2 |
|---|---|---|---|---|---|
| ⊞ 12:04 / 18:17 | *Train only* | 🚆 | 6h13 | CHF 109.97 | 20 kg |
| ⊞ 12:00 / 17:25 | *Car only* | 🚗 | 5h25 | CHF 120.77 | 68 kg |
| ⊟ 13:30 / 22:43 | Zürich (ZRH) >> Nuremberg (NUE) | 🚆 ✈ 🚗 | 9h13 | CHF 311.72 | 152 kg |
| 13:30 / 14:50 | Bern / Zürich (ZRH) | CFF | 1h20 | CHF 49.00 | 6 kg |
| 16:55 / 20:55 | Zürich (ZRH) / Nuremberg (NUE) | Air Berlin ✈ | 4h00 | CHF 259.74 | 145 kg |
| 22:31 / 22:43 | Nuremberg / Nuremberg (NUE) | VGN 🚗 | 0h12 | CHF 2.98 | 1 kg |
| ⊟ 11:35 / 19:58 | Basel (BSL) >> Munich (MUC) | 🚆 ✈ 🚆 | 8h23 | CHF 707.34 | 57 kg |
| 11:35 / 12:55 | Bern / Basel (BSL) | CFF | 1h20 | CHF 39.80 | 4 kg |
| 15:05 / 16:20 | Basel (BSL) / Munich (MUC) | Lufthansa ✈ | 1h15 | CHF 627.01 | 46 kg |
| 18:02 / 19:58 | Munich (MUC) / Basel (BSL) | DeutscheBahn 🚆 | 1h56 | CHF 40.53 | 7 kg |

Fig. 4

PERSONALIZED REAL-TIME LOCATION-BASED TRAVEL MANAGEMENT

REFERENCE DATA

This application is a continuation of International application PCT/EP08/062396 filed on Sep. 17, 2008, the content whereof is hereby incorporated. It claims priority of U.S. Provisional Patent Application No. 61004114 filed on Nov. 24, 2007, the content whereof is hereby incorporated.

FIELD OF THE INVENTION

This invention relates to route planning in travel and transport (logistics), especially to multi-modal route planning in travel and transport (logistics). The invention also relates to user-personalized travel and transport (logistics) management according to the independent claim.

In this context, a travel may concern persons (travellers) or objects, commonly referred to as users. A user can be an individual traveller, a group of travellers, a transport manager, a single package or other object, or group of packages or other objects moved for example in a factory, in a port, etc.

RELATED ART

Route planning requires finding an ideal route from a departure point to a destination point. Users often have many alternatives for routes, but are faced with highly incomplete and difficult to obtain information on routes. Some reasons for this difficulty include the multitude of travel providers, inhomogeneous data formats for schedule information, pricing schemes and taxation among many others. Even when information on alternatives is accessible to users, only a limited subset of alternatives are perceived and even fewer alternatives are actually considered. This often leads to choosing sub-optimal routes for the user. In addition, current travel planning does not allow taking full advantage of transport capacities, resulting in significant transportation overheads.

Current routing mechanisms work well for finding routes on homogeneous networks with perfect information and clearly defined metrics. However, many real-world route planning scenarios result in a number of additional challenges, including (1) highly heterogeneous and variable routes, (2) inaccurate and incomplete information, and (3) a lack of universal, accurate metrics for evaluating, filtering and sorting the different routes.

(1) Real-world routes can be heterogeneous with respect to quantifiable, objective properties of the vehicle or means of transportation (e.g., train speed or plane fuel consumption) and conditions imposed by the travel provider (e.g., limited availability or transport capacity). In addition, routes can vary with respect to the amount of periodical or a-periodical variation in route conditions (e.g., weather conditions or traffic situation) and others. Route variations fall into at least two categories, temporal and geographic variation. Both may lead to unforeseen delays and missed connections.

(2) Real-world route information is usually furnished by travel providers without independent verification and is thus often inaccurate. In addition, information on route networks, especially as far as it concerns multi-modal networks, is often limited to a small subset of travel providers and thus incomplete.

(3) Real-world metrics for routes may be highly dependent on specific and subjective properties of the user. Examples include personal user preferences (e.g., train travel rather than car travel, easy or cheap parking spaces for cars) and personal travel requirements (e.g. special rates, restricted mobility, minimum/maximum changeover times, luggage allowance, risk of reaching or missing a connection, visa restrictions, and so on).

In addition to accurate route information and route metrics, successful route planning requires finding an ideal route from a departure point to a destination point in a limited time. Typically optimal routes must be found from a very large number of possible routes between two points. A typical airport-to-airport journey in Europe via 1 other stop-over ("via") results in more than 1000 route options—this number is much higher for multi-modal travel routes. Evaluating different metrics on all the possible routes is a time consuming process; the results are only presented after a lengthy process. Moreover, the difficulty of route optimization increases exponentially with the number of vias considered, which is why current algorithms can only consider a small subset of all possible travel route options.

There are some restrictions of current travel planning. First, current travel planning, in particular multi-modal travel, is often a static process; travel arrangements and shipping routes are fully determined in advance. Static planning means that users may be faced with severe delays caused by unplanned events such as road accidents, train delays, or weather conditions and events that can be anticipated at some points on (e.g., mass events, holiday traffic, weather conditions). Static planning also results in significant transportation overheads.

Moreover, current travel planning often only considers a small number of general criteria or metrics, not taking into account specific individual travel requirements (e.g. special rates, restricted mobility, minimum/maximum changeover times, luggage allowance, visa restrictions, preferences, etc).

Both types of restrictions are exacerbated for multi-modal travel due to the multitude of travel providers involved and the different constraints for different modes of transportation and for different users.

There are several systems known in the prior art.

US20060184314 discloses a multi-modal navigation system. The navigation system is multi-modal as it provides navigation information (including routes, maps, directions, and navigation instructions) for a plurality of transportation modes including, but not limited to, automobiles, pedestrian walking, trains, subways, and the like. The multi-modal navigation system may be embodied in integrated navigation devices, as stand-alone navigation systems on a variety of computing devices, as a navigation service on a computing device or as a Web service, and the like. The multi-modal navigation system includes route data for a plurality of transportation modes. Route data for the plurality of transportation modes may be integrated, may be separately available, or any combination thereof.

WO03104750 relates to an itinerary search method comprising a step of computing the itinerary from a criterion defined by a user (for example, a point of departure and a point of arrival) and a step of selecting service providers along the computed itinerary, said services being defined by the user.

U.S. Pat. No. 6,591,263 discloses a system and method for disseminating information concerning, for example, conditions affecting travel routes personalizes information in accordance with individual users or customers by building filters for attributes of the information from attributes of interest to each user, such as nodes of a travel route, which are registered with the system by the user or customer. The information is filtered by the filters constructed from the attributes to form a list of user identifications of users that have registered an attribute of interest which is included in the information provided to the system. Messages are retrieved from storage and communicated to users in accordance with the list of user identifications either automatically over one or more communication media also registered by each user or on a call-in inquiry basis. In the latter case and for modification or additions to registered user information and attributes of interest, the system and method provide for an active automated dialog with the user. Messages may include user-specified nomenclature for attributes or collections thereof.

WO0129573 discloses a navigation device. User profiles may be stored and used to navigate a user who may be driving in a vehicle, on foot, or in other mode of transportation. Each user profile corresponds to one of the user's personae.

U.S. Pat. No. 6,834,229 discloses an integrated journey planner for providing travel information for a user specified journey which comprises means for deconstructing a user enquiry specifying the journey into a plurality of information requests, each specifying a part of the journey using a single mode of transport, such as rail, car or coach. This document also describes a Navigator having means for sending each request to an appropriate one of a plurality of local and on-line databases, which each hold travel information regarding a different mode of transport. Further means are provided for reconstructing the responses to the requests received from the plurality of local and on-line databases into at least one multimodal travel option, for the user specified journey, incorporating different modes of transport. Usually, the multi-modal travel option incorporates timetable travel information such as train timetables and non-timetable travel information. The Navigator can also implement uni-modal point to point travel where the user can specify any geographical location and a mode of transport with the most suitable terminals and services being determined.

A common problem with many prior art solutions is the difficulty to change a route while travelling, in particular in case of unexpected events such as delays, cancellations, traffic congestion etc.

Another common problem is the time required for computing and displaying or otherwise presenting route search results.

One aim of the present invention is thus to provide an improved method and system for routing users.

Another aim of the invention is to provide an improved method and system for routing users, notably in heterogeneous networks.

Another aim of the invention is to provide an improved and faster method and system for displaying route search results.

BRIEF SUMMARY OF THE INVENTION

According to the invention, these aims are achieved by means of a method according to claim 1. Advantageous embodiments are indicated in the other claims and in the description.

According to one aspect, the invention also relates to an improved method and system for proposing routes between a departure point and a destination point of a multi-modal network, based on a plurality of metrics and on user dependant preferences and profiles. The user preferences are preferably known in advance and may be determined based on previous user selections and/or behavior.

The method thus reduces the complexity of and time necessary for computing a suitable list of candidate routes, by taking into account user preferences and criteria entered by the user during the computation for restricting the number of candidate routes to consider.

In one aspect, criteria that may be selected during the computation of candidate routes include a provisional list of candidate routes, or a provisional list of candidate nodes, or a provisional list of candidate route segments, or a provisional list of candidate transportation modes, that may be selected or excluded by the user. Selection or exclusion of any of those criteria significantly reduces the number of candidate routes to consider and evaluate during subsequent steps.

The provisional list displayed to the user may be computed very fast using a first set of metrics, and/or little information associated with each candidate routes, while additional metrics and/or additional information on each route is used during subsequent steps.

According to one aspect, the invention also relates to an improved method and system for proposing routes between a departure point and a destination point of a multi-modal network, based on a plurality of metrics and on user dependant preferences and profiles. The user preferences are preferably known in advance and may be determined based on previous user selections and/or behavior.

According to another aspect of the invention the system and the method of the present invention can be used in the same manner in a transport (logistics) scenario. In this context route planning may in particular account for possible further requirements associated with the handover between route segments (waiting times, customs, etc.). An IT system, a logistics service provider, a transport manager, one or more of the couriers along the route, or the sender may then handle the user's decisions and manage user preferences and profiles. It can be therefore be used for the route planning for a single package or other object, or group of packages or other objects.

Additional advantageous embodiments are given in the dependent claims.

BRIEF DESCRIPTION OF THE DRAWINGS

The invention will be better understood with the aid of the description of an embodiment given by way of example and illustrated by the figures, in which:

FIG. 3 shows a screenshot of one possible implementation of a intermediate search page and FIG. 4 shows a screenshot of one possible implementation of a user interface displaying a sample search result.

DETAILED DESCRIPTION OF POSSIBLE EMBODIMENTS OF THE INVENTION

The present invention generally relates to multimodal transportation, i.e., transportation over a network using different transportation modes, such as plane, train, car, bus, metro, taxi, car sharing, foot, etc proposed by various transportation providers such as airline companies, train operating companies, etc. Each company and each provider may have its own schedules, timetables, and travel conditions etc. which make planning of a travel through this network a difficult task.

Figure 2:
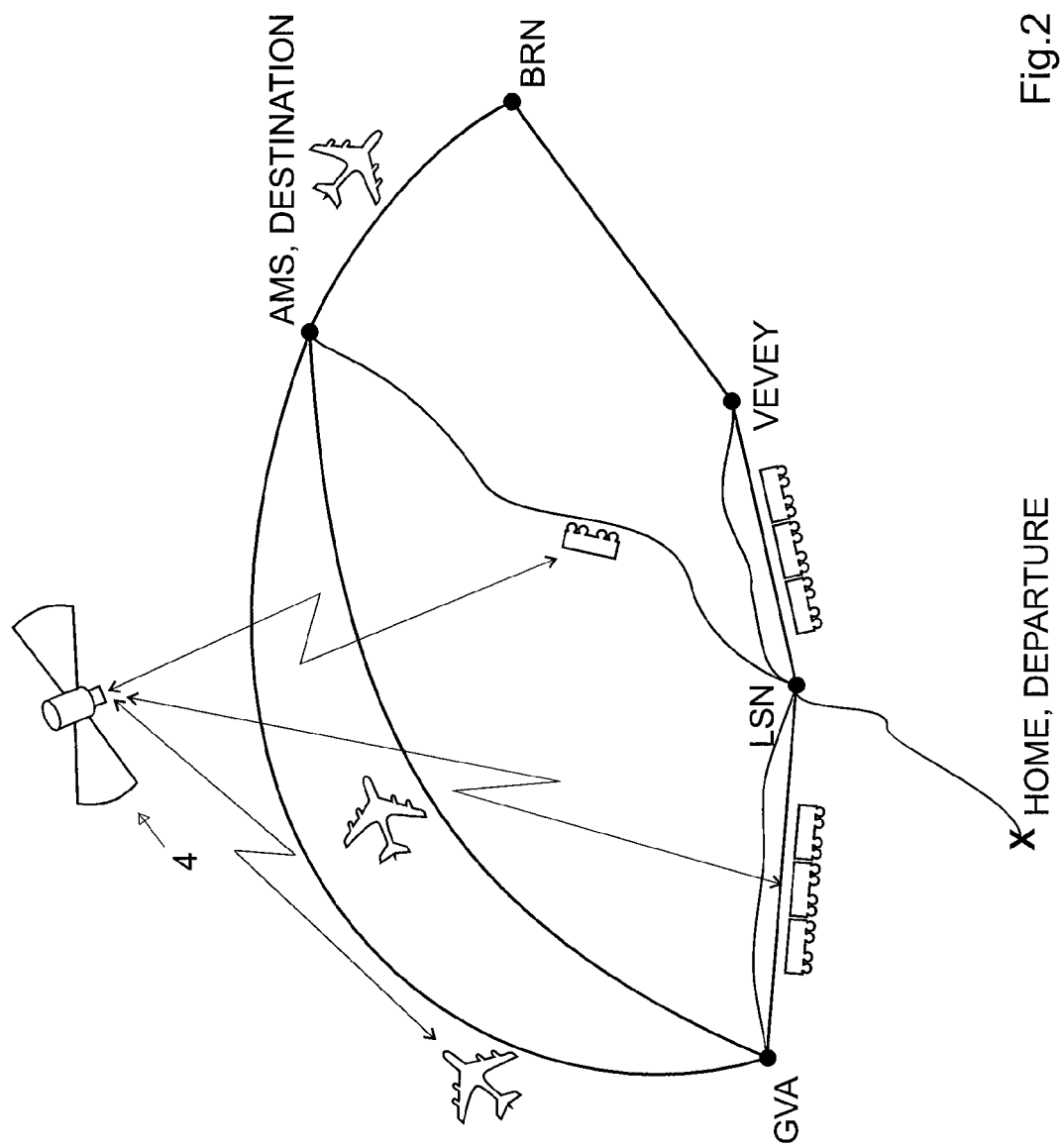
FIG. 2 shows a map and different networks for different multi modal travels.

FIG. 2 illustrates a schematic map of a geographic region covered by different networks for different travels using different mode of transportation. In this application, a route segment is a branch between two nodes (or points) of a network that can be travelled by a user, using one specific transportation mode. A route is a set of one or several mutually connected route segments by which one user can travel from one one departure point to one destination point. A multimodal route is a route made up of different route segments that are travelled using different transportation modes.

FIG. 2 shows different multimodal routes from a departure point HOME (LSN) of a user to the destination point AMS. The Figure show different possible routes between those two points, such as:
- car between Home and LSN; and then
- direct connection by train or car from LSN to AMS;
- train or car from LSN to Vevey, than from Vevey to BRN, and by plane between BRN and AMS;
- train or car to GVA, and one of the two available flights between GVA and AMS.

FIG. 2 also shows a geolocalisation satellite, such as GPS or Magellan satellite, with which a user can retrieve his location while travelling.

Figure 1:
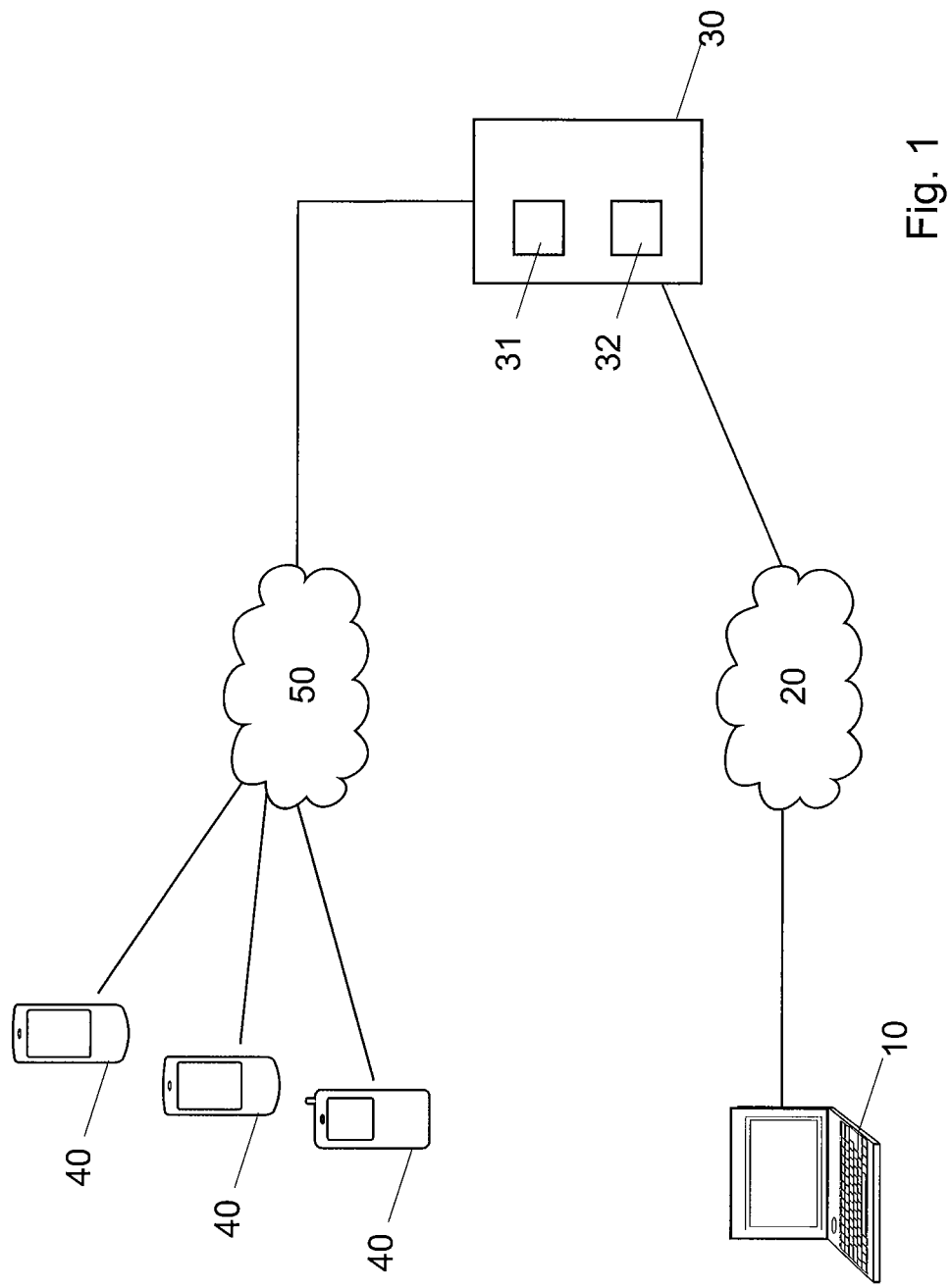
FIG. 1 shows a general view of the system.

FIG. 1 shows a general view of a system according to an embodiment of the invention. The Figure shows an information technology system (IT system) 30, which is connected via the Internet 20 and via a mobile communication network 50 to a plurality of users of the system who want to organize a travel. In this application, the expression "IT system" is intended to cover a centralized single server, a park of servers, a network with several interconnected servers, or a system with a distributed architecture, for example as a peer-to-peer architecture, where tasks are handled in a distributed fashion by different computing devices. The IT system is generally a system different from the personal travel assistants used by the users. Typically, one IT system is shared by different users and different personal travel assistants, and computes routes for different users.

The mobile communication network may comprise a cellular network, a WLAN, or any other suitable wireless data network. The users access this IT system 30 with personal computers 10, especially during planning of the travel, and/or with personal travel assistants 40 during the travel. The personal travel assistants are preferably mobile equipments, such as laptops, PDAs (personal digital assistants), navigation systems, cell phones with a suitable software application, dedicated equipments, etc.

The information displayed to the user on his computer 10 or personal travel equipment 40 can be displayed with a browser and/or with a dedicated application, which has to be installed separately.

In a preferred embodiment, at least some of the personal travel assistants include a geolocalisation equipment, for example a receiver for a satellite geolocalisation device, such as a GPS or Magellan receiver for example. Other geolocalisation equipments and methods, such as localization within the cellular or WLAN network, a connection to an external GPS receiver, an accelerometer, or user input ("I just saw the Tower Bridge out of my left window" or "I am now on the Kurfürstendamm"), may also be used.

Using this geolocalisation equipment, the personal travel assistant can determine its position during a travel, and compare this position with the schedule, or have the IT system 30 make this comparison, as will be described. The information retrieved from those geolocalisation equipments may also be used for monitoring the displacements of the different users and preparing statistics or other data on delays, etc, that may be used for planning future travels of other users. The geolocalisation equipment may also be used for advising alternative routes when the system detects that the scheduled route is not optimal or possible anymore, due for example to delays, travelling mistakes etc.

In a preferred embodiment, at least some of the personal travel assistants include a data sending part for sending data to the IT system 30. This data sending part may comprise for example a cellular equipment able to send data over the cellular network 50, a Bluetooth connection for connecting the personal travel assistant to a user's mobile equipment in the vicinity, etc. This allows the personal travel assistant 40 to transmit its position and other data in real time, for example while travelling, to the IT system 30 which can use this information for adapting the route (when required), sending suggestions etc. This connection can also be used by the IT system for verifying the displacements of the user, checking delays, and using this information for planning further travels of other users Alternatively, or in addition, the personal data may also be connected to the IT system 30 offline, for example after the travel when the user connects his device to a computer on the Internet.

Information sent to the IT system 30 are preferably anonymous, and do not include any information that may be used for identifying the users and determining where they have been. An anonymous server (not shown) may be used between the IT system 30 and the network 40 for replacing the user's identity by an alias.

The IT system 30 includes a database 31, or can access such a database, with data used for planning the travels of the different users. It includes for example timetables, tariffs and schedules of different transportation providers, conditions of those providers (luggage, etc), geographic information including maps or distances between geographic points, weather and traffic forecasts, etc. The database 31 preferably also includes data entered or retrieved by the users, including statistics and data retrieved from previous travels over different travels segments, user comments, notes and scores etc as will be described later. The database 31 may also be a set of different databases in one or different machines, and include for example data stored in remote servers and retrieved over the Internet, for example using SOAP or another suitable technology. Data available in the database 31 may be imported from various sources and converted in a common format that can be used by a software routing engine.

The IT system 30 further comprises a database 32 for storing user preferences and profiles. User preferences and profiles may include for example:
- User's preferred or available mode of transportation
- User's subscriptions
- User's car consumption, number of seats, $CO_2$ emission, etc.
- Special rates, customer fidelity programs, etc.
- Other user settings, including for example user nationality, available passport and visa in case of international travel, etc.
- Minimum/maximum changeover times
- Luggage
- Restricted mobility
- Previous selection of some routes, route segments, or nodes
- Etc.

User preferences may be stored in the database 32 accessible by the IT system 30, as illustrated, and/or locally stored in the user's device (for example as a cookie). At least some of the preferences can be displayed and/or edited via a web interface from the computer 10 or from the personal travel assistant 40. The use of messages such as SMS, voice message and text to speech, e-mail, etc. for editing the user's preferences can be foreseen as well.

In a preferred embodiment, the system is self learning and automatically learns at least some of the user preferences, based for example on explicitly indicated preferences, on selection among list of possible routes, on feedback and/or on observations during the journeys. For example, the system may detect that a particular user systematically prefers the train to the plane, unless the travel time difference exceeds two hours. Neural networks or Hidden Markov Models (HMMs) can be used for analyzing the behaviour of the users and for classifying their preferences in predefined classes.

In another possible embodiment the proposed system can be used in the same manner in a transport (logistics) scenario. In this context the database 32 may then for example contain information specific to a user, such as "fragile", "not to be exposed to heat", "transport with one side up", etc. The user's personal travel assistant may then for example take the form of an RFID chip, memory storage device or other suitable tag fixed to the user and information related to at least one selected route for the user can be made available by reading out the chip or memory. The readout may then be compared with an external or any central database (not shown) or the database 31, which maintains relevant information while travelling.

The list of candidate routes and the ranking of those routes proposed by the system to each user are thus user dependant, and depend on the user preferences stored or computed by the system.

It is important to note that this use of user preferences and/or user profile is entirely independent from the display of results. Taking into account any element of the profile/preferences for computing a list of optimal routes is thus also possible in a system where a complete, definitive list of candidate routes is proposed in one single or in a plurality of steps, without any pre-selection of criteria.

Finding the best routes between two points in a network depends on the metrics used for defining what the best route is. The IT system 30 comprises a software-based routing engine (not explicitly shown) that may use one or several of the following metrics for sorting those best routes, and for ranking the routes in the lists displayed to the user:

Duration of travel. This duration may be retrieved from the timeplanes proposed by the transportation providers, and may optionally include expected or average delays for the travel segment currently considered. For some modes of transportation, such as car, by foot etc, or when a precise timetable is not available, the duration may be estimated based on distance and expected speed, where the expected speed may take traffic congestion into account. An estimation based on distance may also be used when a more precise timetable is available, for example in a first step, for a rough estimation if it is faster or cheaper to use an estimate than to access a time schedule. Alternatively, the duration may be determined from statistics based on information retrieved from previous travellers on each segment.

Duration of each segment of a trip comprising several segments, for example if different segments use different modes of transportation. Some users don't always want to minimize the total duration of the travel, but only the duration with certain modes. For example, travelling by car may be considered a hassle while travelling by boat is a pleasure.

Cost of travel—as indicated by the travel providers or estimated based on distance and gas consumption for example. The estimation of travelling costs may consider travelling subscriptions indicated in the user preferences, the travel class usually selected by the user etc.

Cost of travels segments.

Preferred mode of transportation; comfort, as indicated in the user preferences. Some users would estimate that trains are more comfortable than cars, for example;

Number of stopovers;

$CO_2$, or other air pollutants, emissions (including emission of pollutants part of the Air Quality Index (AQI) and other)

Robustness of each route, for example probability and/or expected duration of delays. This probability of delays may be based on information provided by transportation providers, and/or on geolocalisation data and/or statistics retrieved from the personal travel assistants of previous users.

Risks

Popularity or relevance of the route or of some route segments among previous users. This may include subjective information furnished by previous users in the form of comments, suggestions, feedbacks, notes or score on a travel segment, etc;

Transport provider, terminal, services, hotels, or other information relevant to the user or the algorithm.

Subjective and/or objective data furnished voluntary or automatically by previous users, for example as feedback on a website, or sent/retrieved from users' geolocalisation devices;

Other data collected from past travels of previous or current users;

Passport/visa requirements, etc;

Weather forecasts; Other forecasts, such as disaster forecasts (earthquakes, landslides, tsunamis, etc) or political condition forecasts (unrest, demonstrations, war, etc).

Traffic forecasts, retrieved from external traffic information services and/or based on information retrieved in real time or from past travels of previous users travelling along the same route segments;

Information on each segment retrieved from travel literature, websites, forums, and publications, (for example scenic route; poor service; etc), whereas this information may be quantified with one or several scores, and displayed to the user with the result list;

Number of users travelling together;

Other trips currently made or planned by other users (for example in the case of joint travel, or for organizing car pools etc);

Customer fidelity programs on some segments (for example airmiles, etc);

Possibility of cost reimbursements for some users;

Accommodation costs, quality and availability in case of travels of more than one day;

Available travel insurance;

Sponsored route segments; a transportation provider may for example pay for a modified display of his segments in the list. In a preferred embodiment, sponsored segments are displayed in a separate portion of the display, or otherwise marked as sponsored segments.

etc

This information on the various routes or route segments may be used as a metric for selecting the best routes, and possibly also displayed or otherwise made available to the user, and/or used for other purposes, for example in order to compute insurance premiums on some routes or route segments. Again, the list of metrics actually used, and their priority, may be user-dependant.

The routing engine thus combines objective, quantifiable metrics (such as cost, duration) with more subjective metrics (such as route popularity, user preferences, user feedback or comfort for example). Moreover, some quantifiable metrics, such as expected delay, may be associated with a probability or other statistical values. Artificial intelligence (e.g., reinforcement learning or Kohonen maps) may be used for combining objective and subjective metrics and creating an optimal metric for personalized route planning.

The routing engine further accounts for route heterogeneity by integrating information on transportation modes, travel providers and route conditions among others, from a variety of online and offline information sources, which may include information provided directly by travel providers, information provided by independent sources, statistical information gathered by the routing engine and other entities, information from pertinent literature and publications, among others.

The routing engine thus ensures accuracy of route information by modelling temporal and geographic travel patterns of route networks. In order to provide unbiased route information, the engine uses data from independent sources, such as statistical data gathered from past travel among others, rather and/or in addition to intrinsically unreliable or unverifiable data, such as data furnished by a single travel provider. Periodically varying route conditions are modelled using objective and subjective data of past travel on route segments gathered from users or other sources. A-periodically varying route conditions are accounted for by integrating up-to-date travel information furnished independently or automatically by users or by other services. The system also ensures complete route information by estimating missing route segment information and by intelligently matching and integrating data from different sources. Missing information may be estimated and data intelligently matched and integrated based on methods including heuristics, statistical information, previous trips and user reports. The above-mentioned model built from objective and subjective data is used to construct an accurate, up-to-date and complete representation of a route network.

The metrics that will actually be used for planning a particular travel depend on the given user, or even on a particular set of preferences of this user if he has defined different sets of preferences. One user may for example find extremely important to travel cheap, while another user would put a higher priority on travel duration. In one embodiment, the user may define explicitly the importance of each criterion, for example over a web page and using for example scores or appreciations between "not important at all" up to "essential or extremely important". Moreover, the system may be self learning and automatically determine which criteria are important for each user, based for example on previous selections and/or on user feedback from previous travels.

A user who wants to plan a travel first needs to indicate the departure point, destination point and desired travelling time. This can be done with a web page accessed with the computer 10 or with the personal travel assistant 40, in a conventional manner. The user preferably identifies himself, for example with a login/password, with a SIM card in the case of a cell phone, etc. This identification is used by the IT system 30 for retrieving the corresponding set of user preferences in database 32 that will be used for selecting and sorting the best routes that suit this particular user. The user may also indicate over the web page preferences that will only apply to the specific travel he is currently planning, and which may be different than his general preferences. The user may for example indicate a category for the travel (for example "professional", "family holidays" etc) in order to retrieve a suitable set of preferences if several sets of preferences have been stored for this user.

The IT system 30 then computes and displays a first, provisional list of possible routes between the departure point and the destination point, using a suitable software engine. The list of selected routes is based on information in databases 31 and 32.

Alternatively, the IT system 30 may also propose a provisional list of candidate route segments that may be travelled, or a provisional list of geographical nodes, such as airports, in one or several candidate routes, or a provisional list of transportation modes. For example, the IT system may determine in a first step that car, train and plane are all candidate transportation modes that may be considered for some segments of a travel between the departure point and the destination point, and allow the user to exclude at an early stage any or those modes.

Other criteria may also be computed and proposed to the user for reducing the number of candidate routes to consider.

An example of criteria, here a list of candidate routes that may be displayed on a computer equipment 10 or 40, is illustrated on FIG. 3. This example corresponds to a travel trip from Bern to Nurnberg; different possible routes, using different transportation modes and via different intermediate cities such as Geneva, Basel or Zurich are displayed and selectable by the user.

Because there are many possible routes for a multimodal travel, the first, provisional list is preferably only a rough determination of routes (respectively route segments, nodes, transportation modes) that are likely to suit the user. In one implementation, the first list provides information on likely candidate routes resulting from considerations of a single metric such as for example geographic considerations (such as distances), or resulting from past search results or resulting from other factors.

In one implementation, a subset of all available metrics and/or of all users preferences is taken into account for establishing this first provisional list of criteria—for example only metrics which are easy and/or fast to retrieve or compute. Pre-computation algorithms known in the telecommunication from multi-objective quality of service routing algorithms may be used for this purpose, as well as incremental computation methods.

This first, provisional selection may also be based on a rough estimation for some metrics. In one example, the first list is based on evaluated travel time simply estimated from the distance and expected travelling speed along the different segments. The ranking of the different routes in this list is also based on a subset of all available metrics.

The routing engine may also display a first provisional list after a predetermined time, or when a sufficient number of candidate routes have been found. This first list is based on the information available and computation performed at that time. In this case, the provisional list simply corresponds to a ranked set of routes among all routes for which a metric has been retrieved or computed at that time.

Moreover, the IT system may adaptively cache key route segments, which may depend on statistical measures of their importance, availability, accuracy, and variability among others. The information in cache may be used for establishing the first list, and verified or updated during establishment of the second list or if the user selects a route using this segment.

Afterwards, the list of routes proposed to the user is updated, based on further uninterrupted computation with the same metrics, and/or on further continuous computation of further metrics and/or further routes. A new updated list is then proposed and displayed to the user. In an embodiment, a new list is automatically computed and proposed to the user after a predetermined delay, for example after 20 seconds. In another embodiment, a new updated list is proposed only when the changes are important enough. In still another embodiment, a new updated list is displayed only after a user action, for example if the user clicks on an "update" button on the interface. The new list may also be automatically updated based on choices made by other users.

Additionally, the updated list also depends on refinements and selection of criteria among the criteria proposed during previous steps. The user may for example pre-select or exclude routes, route segments, nodes or transportation modes from the search, for example by clicking or otherwise selecting one or several routes among the different routes that are proposed. For example, the user may exclude some airports (or other nodes) from the list, or select one preferred airport, and/or indicate one preferred transportation mode, and/or exclude another transportation mode between two segments, for example between the departure point and the first airport and/or between the last airport and the destination point. The user may also define additional sorting criteria.

The updated list may include additional routes not considered in previous provisional lists, and/or may exclude routes selected in the provisional list, depending on metrics or routes not considered before, and/or on user refinements. The order of the routes in the list may also be different. As will be described later, the amount of information presented with each list, and/or the presentation of the information, may also be different.

Those steps may be iteratively repeated and a series of updated lists of routes may be proposed to the user.

In a possible, non illustrated embodiment, the first list is displayed on a user's device 10, 40 on a geographical map, for example with different arrows between the starting and destination point. The first list may also be displayed as text or with minimal images. In one embodiment, only a limited amount of information is displayed for each possible route in this first list.

As indicated, the second (and subsequent) list of candidate routes between the departure point and the destination point may be based on more complete and/or more precise set of metrics and/or set of user filtering criteria. The FIG. 4 shows an example of second list displayed to the user.

As can be seen, the second list of FIG. 4 may include more information on each route than the first provisional list of FIG. 3. There can be more than two iterations, wherein typically more and more information on each route is displayed after each iteration.

The display of information during the search, as well as the display of the first and second lists, may use personalized forms, where personalization may depend on information specified by the user (e.g., as part of a user profile), statistically gathered information (e.g., the number of times a user has visited the site) or information that depend on the user's interaction with the information display (e.g., the user's speed in performing the search or the information display features the user uses) as well as a combination of information. In one example, the display depends on the user total experience, taking into account the time spent, and/or number of searches performed, most often used features, etc. In one implementation, a user that has no trouble entering the required search information and does so in a rapid and efficient fashion will be presented with detailed result display(s) with many options, whereas a slower user will be presented with simplified result display(s).

In addition, the IT system may use the objective and subjective user preferences and search criteria to provide users with highly targeted advertisements, for example in the form of sponsored search results, typically separated from the main results, (e.g., a special offer for a researched route or part of a researched route by a transport provider), in the form of location-specific advertising (e.g., advertising for a hotel or tourist attraction at the destination, or advertising for a particular airport around the user's departure point), in the form of banner advertising (e.g., for a rain jacket for a trip to Scotland).

The search engine that computes the first list and the second list thus uses different metrics and considers different user preferences at each stage. Moreover, a different algorithm may be used at each stage. For example, the first list of criteria, such as candidate routes, may be based on a simple computation of a score for each route, while the second stage may use more complex algorithms based on artificial intelligence for example.

The user can then select one particular route among the different candidate routes proposed in the second or last list. The schedule of the selected route is stored in the IT system 30, and compared during or after the trip with the geolocalisation data and other information and feedback retrieved from the user. The system preferably also comprises a module for ordering the necessary tickets, providing any additional support and information on the travel, including maps and plans which may be sent or made available to the user's personal travel assistant 40, and/or sent to any device of the user by email, SMS, voice call, etc A possible use of the system is related to planning of joint travel. In many cases travel can be improved by optimizing overall routes, instead of optimizing each route of each user individually. Consider, for example, a highway with cars of different speeds. Cars trying to individually optimize their speed may result in an overall stop-and-go traffic with low throughput, whereas optimizing overall car routes may result in a more homogeneous traffic flow with high throughput. The advantage of optimizing overall routes becomes even more apparent when considering cars with different importance, for example with the addition of ambulances.

Thus, in one possible implementation, the routing engine may simultaneously optimize routes for multiple users. For example, two (or more) users may be at different starting locations but have the same destination point and would like to travel together from some point onwards (e.g. take the same airplane). A personalized travel metric may find and rank optimal routes accounting for this wish, and propose one or more successive list of those routes to the different users.

Another possible use of the system relates to a possible situation where several users are travelling together, while during the travel, one user wants to re-optimize his route and define a new destination point for himself, without necessarily affecting the route of the other users. The system may then propose a new route for this user, and automatically inform the other travellers, and possibly re-optimize their routes if a more optimal route is possible once this user has left the group.

Still another use relates to a situation where two users unexpectedly meet during a travel, decide to travel together, and send a request to the system for re-organizing the common part of the journey.

Unexpected events that may occur during planned joint travel comprise for example situation where one of the joint travellers miss a connection, or is delayed, or decides to change his itinerary; in those situations, the system may automatically generate an electronic message informing all concerned users of this unexpected event, reorganize the route of the other users in the joint travel, and/or propose to renounce to the joint travel or to split the group of users on some or all route segments.

In case of joint travel planning, the system may propose and/or use various methods to allow users to agree on their travel routes, including auction systems, voting systems, etc. It may also allow users to narrow all available options by selecting some criteria or some routes, or select criteria or routes for the user. Instant messaging or chat functionalities may also be available to the users in order to facilitate the negotiation. A user may also choose to desist and leave the group if no suitable proposition for joint travelling can be found.

The list of routes proposed to the different users takes the different preferences and profiles of the users into account, and propose a trade-off between those preferences, for example in case of incompatible preferences. For example, if one user likes the train while another one prefers the bus, the routing engine may propose both options to both users.

Once a route has been selected and accepted by all users, all participants are preferably informed.

Thus, in one possible implementation the system may simultaneously propose multiple routes for a group of users travelling at least in part together, and may take into account differences between users including different user priorities. In this case the system may for example take group reductions or car pooling into account when proposing the best route. This allows for example a group of four users travelling together to compare the price and advantage of sharing the car of one of the users versus taking the train. The system may even propose the best suited car if different users in the group have a car, taking into account the number of available seats, the consumption, the comfort, etc.

In one embodiment, the system may for example propose one route comprising a segment of joint travel with another user, help both users to contact themselves, and reroute users willing to participate to this joint travel if they had previously confirmed a route.

In another possible embodiment the proposed system can be used in the same manner in a transport (logistics) scenario. In this context route planning may in particular account for possible further requirements associated with the handover between route segments (waiting times, customs, etc.), and an IT system 30, a logistics service provider, a transport manager, one or more of the couriers along the route, or the sender may then handle the user's decisions and manage user preferences and profiles.

It is important to note that this aspect of optimization of joint travel is entirely independent from the display of results. Joint travel computation is thus possible in a system where a complete, definitive list of candidate routes is proposed in one single or in several successive steps, without any pre-selection or exclusion of criteria.

Another possible use of the system relates to dynamic rerouting in the case of changes due to unexpected (including predicted) events or changes in the route schedule. In one aspect, the invention may allow users to plan, book and dynamically re-route routes in real-time and while they are travelling. This may allow users to be informed about and to accurately react to travel events both unexpected and those that can be anticipated from a certain point on.

In this case, the current route (i.e., the route previously selected and currently followed by the user) may be revised or a new route computed and proposed to accommodate such changes, while accounting for personal information. If the route comprises a lot of different nodes and segments between the nodes, it may also be possible or preferable to only recompute some segments, i.e., instead of recalculating the whole route based on complete information in the central IT system, the segments of the route concerned by the event may be recomputed, locally in the user's personal travel assistant, or centrally in the IT system 30. The system may for example propose to avoid an accident by exiting the highway and reentering it at the next entrance. The decision to recompute or not some segments may also depend on the efforts needed for modifying previously selected route segments, for example on the possibility to have previously ordered travel tickets reimbursed or replaced.

Unexpected (including predicted) events may comprise for example delays, cancellations, bad weather, users wanting to make a change. Unexpected events may also concern other users of the system; for example, in case of joint planning, the IT system 30 may detect that one user in a group has missed his bus, and propose an alternative route to all users to avoid cancellation of the meeting. Voting mechanisms may be proposed if the users disagree on the new route to select; the personal travel assistant may also help the different users to establish a voice and/or data communication between themselves in case of unexpected event, and help all users to rearrange the travel.

Rerouting may be triggered by any one of the following events:
  Comparing in the IT system and/or in the user's personal travel assistant 40 the scheduled time and location with the current time and location measured by the assistant;
  Information on delays retrieved from the transportation providers, from news services, or from different sources including current weather and weather forecasts
  Information from other users collected by other users of the system. For example, the central IT system may detect that the plane XY expected to start in 60 minutes from Geneva is still in Amsterdam and thus will be delayed.
  Computation and display of a probability of catching the next segment or transportation means in a route;
  User input, for example if the user indicates during its travel that he wants to make a change
  Current location of other users for example in the case of joint travel.

At least some of those events are detected by the central IT system in which the route selected by the user has been stored and which follows the displacements of the user during travel. Other events may be detected locally in the user personal travel assistant and possibly transmitted to the central IT system 30. As already indicated, a reaction, for example a new route or new segments, triggered by those events may be proposed by the central system 30 and/or by the user's personal travel assistant 30.

In all of those situations, the IT system 30 and/or the user, or the user's device, will propose one or several alternative routes. If the change is minor, the route may be adapted without waiting for a user's confirmation. In most situations, a new list with one or more routes (or route segments) is proposed to the user, for example displayed during the travel on his personal travel assistant. The user then needs to confirm that he wants to change his route, for example by selecting one of the new routes.

The IT system 30 (or the personal travel assistant) may propose a support for those alternative routes, including the possibility to buy new tickets, to cancel or have reimbursed previous tickets, to display new schedule, etc.

The bidirectional communication channel between the user's personal travel assistant 40 and the IT system 30 may be used for ordering tickets, rebooking, additional questions, etc.

In one possible implementation the invention thus allows users to plan, book and dynamically re-route routes in real-time and while they are traveling. This may allow users to be informed about and to accurately react to travel events both unexpected and those that can be anticipated from a certain point on.

As already mentioned, in one possible implementation the system is aware of other users, for example users belonging to the same community as the travelling user. A community may be built by each user on the IT system's website or another website; a user may for example define a first community with all members of his family, a second community with colleagues, etc. Also, the system may integrate information on family, friends and colleagues from a network system such as Facebook, Myspace, Linkedin, Xing, Twitter, an alumni list, for example) in order to determine a list of other whose displacements or current location matter. Other relevant users may also be identified automatically, for example using artificial intelligence.

In such an implementation, the system may include for example methods to:
- Notify users that a friend or colleague will be in a destination city at the same time and propose convenient solutions to arrange a meeting—or to avoid this other user if you don't want to see him.
- Notify users that a friend or colleague is living 30 minutes from the airport while they have a 3 hour stop-over and propose convenient solutions (e.g., a meeting location).
- Notify users that a friend or colleague is planning a similar trip at approximately the same time and propose convenient solutions (e.g., car pooling).
- Notify users during booking, check-in, or during transport that a friend or colleague has booked or is taking the same flight and may propose convenient solutions (e.g. reserving joint seating).
- Notify users of a doctor, a child, a frail or elderly person requiring assistance, or another special user.
- Match early and late users, which may for example benefit from an exchange of their reserved airplane tickets
- Allow early and late users to match themselves. For example, the system may notify users of a bidding offer from another user, or allow users to bid for travel options in real-time. For instance, a user who has missed a flight might have to book a later flight but may then offer to trade seats with another user on a fully-booked, earlier flight. As another example, an airline might use a similar bidding system to resolve rebooking for an overbooked flight.

The system may also offer users a route insurance. The system may itself use information including predictions for the risk of travel delays, missed or reached connections or cancelled flights by evaluating travel information, such as that pertaining to the current route network or by using statistic information on past routes, among others, to calculate insurance premiums or furnish relevant information to another company. In one possible implementation of such an insurance, a user may insure himself for the fastest available route. In the event of unexpected route changes on the booked route, the system may then propose optimal routes completely covered, partially covered or not covered by the user's insurance, and then dynamically re-book route segments or an entire route and cover any surcharges. Other possible insurances include insurance for transportation (e.g., it may cover taxi transportation to replace a failure in bus service), for a route segment (e.g., it may cover flight re-booking charges for a missed flight), for a specific arrival time (e.g., it may cover the cheapest route that allows you to reach your destination point before the insured arrival time), among others. In particular, such an insurance may take advantage of travel dynamics arising with route optimization for multiple users (Section D). The premium can be calculated dynamically, i.e., a user can purchase insurance at any time (even when they have already missed a flight, for example).

The system may offer users to aggregate, track and manage various information pertaining to travel and offer further services (e.g. automatic generation of expense reports, user travel statistics, or frequent flyer miles balance). Such services may be enhanced by intelligent assistants that make specific, personalized recommendations (e.g., recommending a public transport subscription based on the users past travel).

The system may offer users to book and re-book routes or route segments using information including all of the above mentioned with a single click.

We will now describe an example of situation involving the method of the invention. Consider the following example scenario:

Suppose you have booked a trip from Lausanne to Amsterdam for example by using a web interface to enter your home address in Lausanne and the address of your destination in Amsterdam as well as an approximate desired time for your trip, then choosing one of the routes proposed and then booking that route with the different travel providers for train, bus and air travel online. As you commence your trip with the local bus to take you to your connecting train at Lausanne station your personal travel assistant (PTA) rings and informs you that the bus you are sitting in is running late. While you worriedly look at the long lines of rush-hour traffic outside, your PTA has received updated information from the IT system which predicts that you still have an 85% chance of arriving at the station to catch your train with 3 minutes to spare.

As you exit the bus at the station your PTA informs you on a friendly green background that you have 4 minutes to spare which is plenty of time. It shows you a map of the station and soon you board the train. However, as your train pulls away minutes later your PTA rings again. This time its background is red: "You are moving into the wrong direction—have you boarded the wrong train?"

As you turn to another passenger for reassurance you find out that you have in fact done exactly that. Your PTA has already updated your travel itinerary to account for your mishap and proposes you three options:

(1) Exit at next stop (Vevey). Taxi from Vevey to Geneva airport (approximately EUR 160). Continue original route.
Arrival in Amsterdam at 20:20 (as planned). All costs except taxi insured.

(2) Exit at next stop (Vevey). Catch next train to Geneva. Rebook SwissAir flight.
Arrival in Amsterdam at 20:20+3:30 h. All costs insured.

(3) Exit at next stop (Vevey). Catch next train to Geneva. Book AirBerlin flight (EUR 133).
Arrival in Amsterdam at 20:20+1:30 h. All costs except AirBerlin flight insured.

You have just decided on option 2, which allows you to take full advantage of your travel insurance, as the conductor approaches and addresses you in French. Since you do not speak a word of French, you turn to your PTA. A click on the Help button later you hand it to the conductor who reads: "Je suis monté dans le train pour Bern au lieu du train pour Genève aéroport. Pourriez-vous me vendre un nouveau billet de Vevey à Genève aéroport s'il vous plaît?" (I have boarded the train to Bern instead of the train to Geneva airport. Could you please sell me a new ticket from Vevey to Geneva airport?).

An hour later you pass the long lines of people queuing at the airport desk. Having rebooked your plane with a few clicks while still on the train, your PTA now informs you that you still have 35 minutes before boarding starts at gate 42. You decide to use the time to enjoy an early dinner at an airport restaurant that other users have recommended for its Swiss specialties and fast service. You also take a moment to review your changed itinerary and happily notice that your PTA has managed to reserve you a window seat at the front of the plane—your favorite seats as specified in your user profile preferences. Furthermore you realize that given your changed arrival time you will probably be tired when you arrive in Amsterdam and will no longer feel like taking a stroll along the canals around Rembrandtplein square as you had planned. In addition your PTA forecasts rain for your arrival in Amsterdam. On a whim you decide to postpone your tourist interests by a day and to save some money by choosing a cheaper hotel closer to the airport. A few clicks later you have selected a reasonably priced hotel halfway between the airport and the city center and are scrolling through their available rooms . . . .

The invention claimed is:

1. A personalized real-time location-based travel management method, the method including the steps of
   (a) obtaining, by a computer processor, a departure point and a destination point for multimodal travel input from a user;
   (b) generating, in the computer processor, a list of multimodal candidate routes for the user including one or more modes of travel between said departure point and said destination, wherein the computer processor is shared by a plurality of users, which includes the user, to generate respective routes for the plurality of users;
   (c) obtaining, by the computer processor, a selection from the user of a first route from the list of candidate multimodal routes, acquiring travel information relating to the first route selected while the user travels the first route, and providing the travel information to at least one of a personal travel assistant of the user or the computer processor while the user travels the first route;
   (d) analyzing, in at least one of the personal travel assistant or the computer processor, the travel information to detect an unexpected event during travel of the first route and generating an alternative list of candidate multimodal routes in response to said unexpected event; and
   (e) purchasing, by the computer processor, an alternative multimodal route, from the alternative list of multimodal candidate routes, among different transportation providers during travel of the first route by the user, wherein the alternative multimodal route contains sub-routes provided by different transportation providers.

2. The method of claim 1, comprising the step of using a web interface to enter departure point and the destination point, then choosing one of the candidate routes proposed and then booking that route.

3. The method of claim 1, comprising the step of making travel information selected from a web interface available to said personal travel assistant.

4. The method of claim 1, comprising a step of predicting, by the computer processor, that a previously planned connection will be missed during travel prior to a scheduled time of the previously planned connection, and proposing the alternative list of candidate multimodal routes to the user.

5. The method of claim 4, comprising a step of computing a probability that a future connection will be missed or reached.

6. The method of claim 1, wherein the position of the personal travel assistant is sent to the computer processor and compared to the schedule for determining unexpected events.

7. The method of claim 1, wherein only one or more route segments concerned by said unexpected event are computed.

8. The method of claim 1, wherein a new list of candidate routes or routes segments is proposed to the user in reaction to said event.

9. The method claim 1, wherein displacements of the plurality of users are monitored for determining if the alternative list of candidate multimodal routes or route segments should be proposed.

10. The method of claim 1, comprising simultaneous optimization of multiple routes for multiple users taking into account different user preferences.

11. The method of claim 1, comprising a step of recommending, with said personal travel assistant, information for booking additional tickets needed for the alternative multimodal route.

12. The method of claim 1, wherein the computer processor offers users a route insurance using information to calculate insurance premiums, the information including at least one of predictions for a risk of travel delays, or missed connections or cancelled flights from evaluation of travel information, wherein the travel information pertains to at least one of a current route network or statistic information on past routes.

13. The method of claim 12, wherein, in case of unexpected events, the list of alternative candidate multimodal routes is proposed or ranked in function of the coverage by the user's insurance.

14. The method of claim 1, wherein the route planning is executed for a shipment of one or more packages, wherein user preferences are determined via one of the computer processor, a logistics service provider, a transport manager, one or more of the couriers along the route, or the sender.

15. An IT system comprising a server configured to execute computer-executable components, the computer-executable components comprising:
   a non-transitory, computer-readable medium having stored thereon:
      a database for retrieving information relating to different multimodal travel routes; and
      a database for retrieving information on user preferences; and
   at least one computer processor coupled to the non-transitory, computer-readable medium, the at least one computer processor configured as:
      a routing engine for providing a list of candidate multimodal routes, between a departure point and a destination point input from a user, based on said information relating to different multimodal travel routes and said user preferences, wherein respective routes on the list of candidate routes include one or more modes of travel,
   wherein said routing engine is further configured to monitor travel information related to a multimodal route while the user travels the multimodal route, to analyze the travel information to detect unexpected events, and to purchase an alternative multimodal route among different transportation providers in response to said unexpected events while the user travels the multimodal route, wherein the alternative multimodal route contains sub-routes provided by different transportation providers.

16. The IT system according to claim 15, wherein the route planning is executed for a shipment of one or more packages, wherein user preferences are determined via one of the IT system, a logistics service provider, a transport manager, one or more of the couriers along the route, or the sender.

* * * * *